United States Patent
Lin et al.

(10) Patent No.: US 10,476,309 B2
(45) Date of Patent: Nov. 12, 2019

(54) WIRELESS POWER TRANSFER SYSTEM AND A WIRELESS POWER RECEIVER THEREOF

(71) Applicant: National Chi Nan University, Puli, Nantou (TW)

(72) Inventors: Yo-Sheng Lin, Nantou (TW); Chien-Chin Wang, Nantou (TW)

(73) Assignee: NATIONAL CHI NAN UNIVERSITY, Puli, Nantou (TW)

(*) Notice: Subject to any disclaimer, the term of this patent is extended or adjusted under 35 U.S.C. 154(b) by 294 days.

(21) Appl. No.: 15/593,246

(22) Filed: May 11, 2017

(65) Prior Publication Data
US 2018/0069433 A1 Mar. 8, 2018

(30) Foreign Application Priority Data
Sep. 7, 2016 (TW) .............................. 105128949 A

(51) Int. Cl.
| | |
|---|---|
| *H02J 50/12* | (2016.01) |
| *H02J 7/00* | (2006.01) |
| *H02J 7/02* | (2016.01) |
| *H02M 3/07* | (2006.01) |
| *H02M 1/00* | (2006.01) |
| *H02M 7/219* | (2006.01) |

(52) U.S. Cl.
CPC ............ *H02J 50/12* (2016.02); *H02J 7/0044* (2013.01); *H02J 7/025* (2013.01); *H02M 3/07* (2013.01); *H02M 2001/007* (2013.01); *H02M 2007/2195* (2013.01); *Y02B 70/1408* (2013.01); *Y02B 70/1441* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,391,469 B2* | 7/2016 | Kim | ........................ | H02J 7/025 |
| 2001/0033505 A1* | 10/2001 | Reilly | ...................... | H02J 9/062 |
| | | | | 363/125 |
| 2005/0052220 A1* | 3/2005 | Burgener | ............... | H02M 3/073 |
| | | | | 327/536 |
| 2006/0006855 A1* | 1/2006 | Feng | ........................ | H02M 3/07 |
| | | | | 323/282 |
| 2011/0266880 A1* | 11/2011 | Kim | ........................ | H02J 50/12 |
| | | | | 307/104 |
| 2012/0049894 A1* | 3/2012 | Berchtold | ............ | G11C 27/024 |
| | | | | 327/94 |
| 2014/0152251 A1* | 6/2014 | Kim | ........................ | H02J 7/025 |
| | | | | 320/108 |

(Continued)

*Primary Examiner* — Daniel Kessie
(74) *Attorney, Agent, or Firm* — Womble Bond Dickinson (US) LLP

(57) ABSTRACT

A wireless power transfer system includes a wireless power transmitter and a wireless power receiver. The wireless power receiver includes: a receiver resonator for wirelessly receiving power from the wireless power transmitter through resonant inductive coupling to generate an AC induced voltage; an AC-to-DC converter having a first input terminal and a second input terminal that are connected to the receiver resonator for receiving the AC induced voltage therefrom, and converting the AC induced voltage into a DC converted voltage; and a power storage element connected to the first and second input terminals of the AC-to-DC converter.

10 Claims, 10 Drawing Sheets

(56) References Cited

U.S. PATENT DOCUMENTS

| | | | |
|---|---|---|---|
| 2015/0280452 A1* | 10/2015 | Nalbant | H04B 5/0037 |
| | | | 307/104 |
| 2017/0080808 A1* | 3/2017 | Bai | H02M 3/33507 |
| 2017/0229921 A1* | 8/2017 | Hwang | H03F 3/3015 |
| 2018/0006498 A1* | 1/2018 | Suzuki | H02J 50/00 |
| 2018/0159382 A1* | 6/2018 | Lin | H02J 50/90 |

* cited by examiner

WIRELESS POWER TRANSFER SYSTEM AND A WIRELESS POWER RECEIVER THEREOF

CROSS-REFERENCE TO RELATED APPLICATION

This application claims priority of Taiwanese Patent Application No. 105128949, filed on Sep. 7, 2016.

FIELD

The disclosure relates to a power transfer system, and more particularly to a wireless power transfer system and a wireless power receiver thereof.

BACKGROUND

Referring to FIGS. 1 and 2, a conventional wireless power transfer system transfers power through resonant inductive coupling, and includes a wireless power transmitter and a wireless power receiver. For the wireless power receiver, when a switch (SW1) conducts while another switch (SW2) does not conduct as shown in FIG. 1, an AC (alternating current) current output (Is) provided by a receiver resonator has a peak amplitude that is greater than zero as shown in FIG. 3 and that decreases gradually (not shown), and a DC (direct current) current output (Ir) provided by an AC-to-DC converter 9 to a load has a peak magnitude that is greater than zero as shown in FIG. 3 and that decreases gradually (not shown); and when the switch (SW1) does not conduct while the switch (SW2) conducts as shown in FIG. 2, the peak amplitude of the AC current output (Is) is greater than zero as shown in FIG. 3 and increases gradually (not shown), and the peak magnitude of the DC current output (Ir) is zero as shown in FIG. 3 (i.e., no current).

The AC current output (Is) has a relatively large root mean square amplitude when the AC-to-DC converter 9 provides no current to the load, resulting in relatively large power loss of the wireless power receiver and relatively low power conversion efficiency of the wireless power receiver. Moreover, the AC current output (Is) flows back and forth through the conducting switch (SW2), so body switching technique has to be used on the switch (SW2) when the switch (SW2) is a MOSFET (metal oxide semiconductor field effect transistor) switch.

SUMMARY

Therefore, an object of the disclosure is to provide a wireless power transfer system and a wireless power receiver thereof that can alleviate the drawbacks of the prior art.

According to an aspect of the disclosure, the wireless power transfer system includes a wireless power transmitter and a wireless power receiver. The wireless power transmitter is capable of resonating at a resonance frequency, and is for wirelessly transmitting power at the resonance frequency. The wireless power receiver includes a receiver resonator, an AC-to-DC converter and a power storage element. The receiver resonator is capable of resonating at the resonance frequency, and is for wirelessly receiving the power from the wireless power transmitter at the resonance frequency through resonant inductive coupling to generate an AC (alternating current) induced voltage. The AC-to-DC converter has a first input terminal and a second input terminal that are connected to the receiver resonator for receiving the AC induced voltage therefrom, and an output terminal. The AC-to-DC converter converts the AC induced voltage into a DC (direct current) converted voltage, and outputs the DC converted voltage at the output terminal thereof. The power storage element is connected to the first and second input terminals of the AC-to-DC converter.

According to another aspect of the disclosure, the wireless power receiver includes a receiver resonator, an AC-to-DC converter and a power storage element. The receiver resonator is capable of resonating at a resonance frequency, and is for wirelessly receiving power at the resonance frequency through resonant inductive coupling to generate an AC (alternating current) induced voltage. The AC-to-DC converter has a first input terminal and a second input terminal that are connected to the receiver resonator for receiving the AC induced voltage therefrom, and an output terminal. The AC-to-DC converter converts the AC induced voltage into a DC (direct current) converted voltage, and outputs the DC converted voltage at the output terminal thereof. The power storage element is connected to the first and second input terminals of the AC-to-DC converter.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 4:
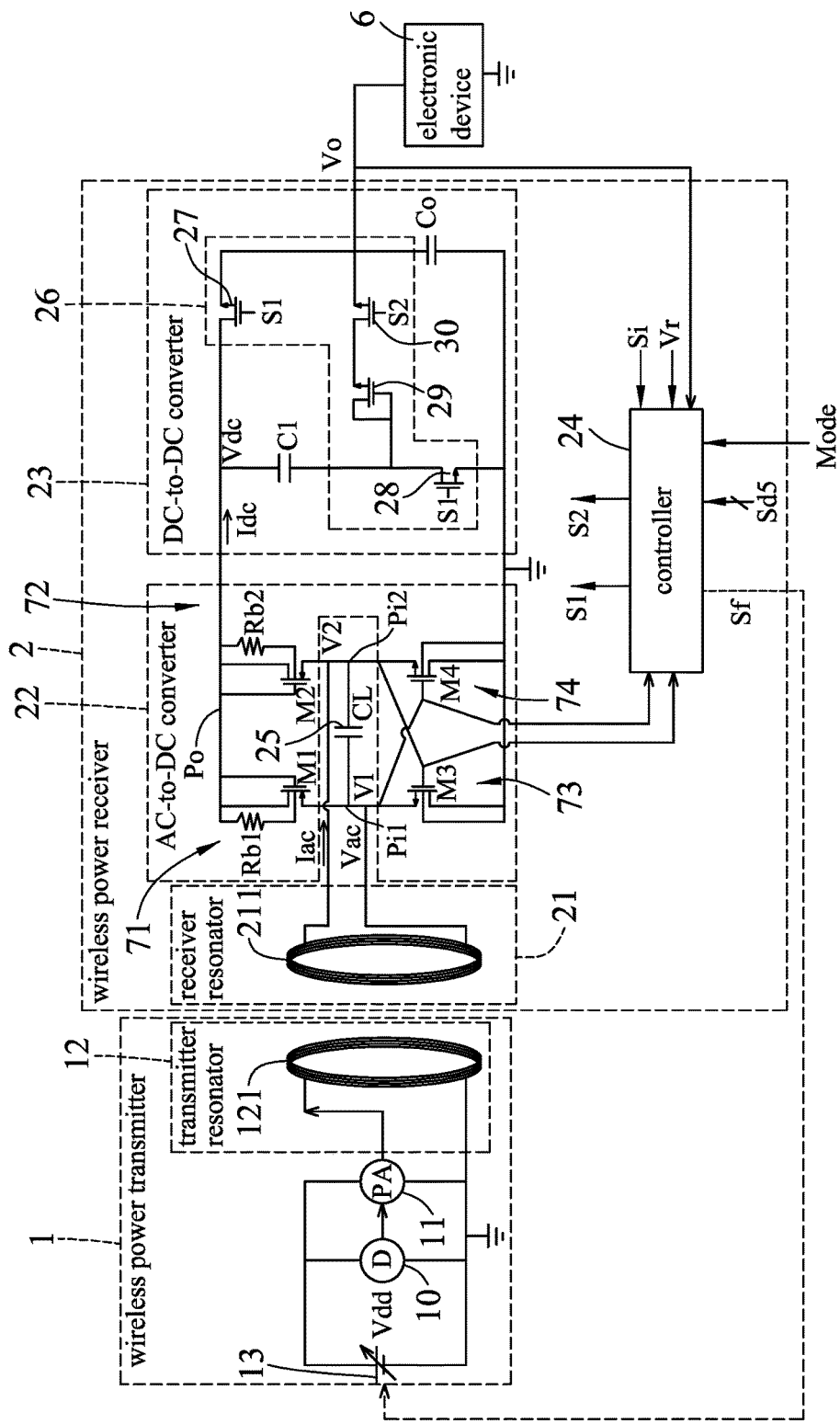
FIG. 4 is a circuit block diagram illustrating an embodiment of a wireless power transfer system according to the disclosure in use with an electronic device.

Referring to FIG. 4, an embodiment of a wireless power transfer system according to the disclosure is used to charge an electronic device 6 (e.g., a mobile phone, a computer or the like), and includes a wireless power transmitter 1 and a wireless power receiver 2.

The wireless power transmitter 1 is capable of resonating at a resonance frequency, and is for wirelessly transmitting power at the resonance frequency.

In this embodiment, the wireless power transmitter 1 includes a power supply 13, a driver (D) 10, a power amplifier (PA) 11 and a transmitter resonator 12. The power supply 13 generates a direct current (DC) supply voltage (Vdd) with a variable magnitude. The driver 10 is connected to the power supply 13 for being powered by the DC supply voltage (Vdd) therefrom, and generates a driving signal. The power amplifier 11 (e.g., a class-E power amplifier) is connected to the power supply 13 for being powered by the DC supply voltage (Vdd) therefrom, and is connected further to the driver 10 for receiving the driving signal therefrom. The power amplifier 11 generates, based on the driving signal, an oscillation signal with the resonance frequency (e.g., 13.56 MHz). The oscillation signal has a voltage swing positively correlated to the magnitude of the DC supply voltage (Vdd). The transmitter resonator 12 is capable of resonating at the resonance frequency, and is connected to the power amplifier 11 for being driven by the oscillation signal therefrom to wirelessly transmit the power.

The wireless power receiver 2 includes a receiver resonator 21, an AC-to-DC converter 22, a power storage element 25, a DC-to-DC converter 23 and a controller 24.

The receiver resonator 21 is capable of resonating at the resonance frequency (i.e., 13.56 MHz), and is for wirelessly receiving the power from the transmitter resonator 12 at the resonance frequency through resonant inductive coupling to generate an AC (alternating current) induced voltage (Vac) that has a peak amplitude positively correlated to the magnitude of the DC supply voltage (Vdd).

In this embodiment, each of the transmitter and receiver resonators 12, 21 includes a self-resonant coil 121, 211. However, in other embodiments, each of the transmitter and receiver resonators 12, 21 may include a capacitor, and a coil that is connected to and resonates with the capacitor.

The AC-to-DC converter 22 has a first input terminal (Pi1) and a second input terminal (Pi2) that are connected to the receiver resonator 21 for receiving the AC induced voltage (Vac) therefrom, and an output terminal (Po). The AC-to-DC converter 22 converts the AC induced voltage (Vac) into a DC converted voltage (Vdc), and outputs the DC converted voltage (Vdc) at the output terminal (Po) thereof.

In this embodiment, the AC-to-DC converter 22 includes four switches 71-74. The switch 71 is connected between the first input terminal (Pi1) and the output terminal (Po), and permits current flow therethrough from the first input terminal (Pi1) to the output terminal (Po) when conducting. The switch 72 is connected between the second input terminal (Pi2) and the output terminal (Po), and permits current flow therethrough from the second input terminal (Pi2) to the output terminal (Po) when conducting. The switch 73 is connected between the first input terminal (Pi1) and ground, and permits current flow therethrough from ground to the first input terminal (Pi1) when conducting. The switch 74 is connected between the second input terminal (Pi2) and ground, and permits current flow therethrough from ground to the second input terminal (Pi2) when conducting. Each switch 71-74 prevents the current flow when not conducting.

In this embodiment, each switch 71, 72 includes a transistor (M1, M2) and a resistor (Rb1, Rb2). The transistor (M1) (e.g., a P-type metal oxide semiconductor field effect transistor (pMOSFET)) has a first terminal (e.g., a source terminal) that is connected to the first input terminal (Pi1), a second terminal (e.g., a drain terminal) that is connected to the output terminal (Po), a third terminal (e.g., a bulk terminal), and a control terminal (e.g., a gate terminal) that is connected to the output terminal (Po). The resistor (Rb1) is connected between the third terminal of the transistor (M1) and the output terminal (Po). The transistor (M2) (e.g., a pMOSFET) has a first terminal (e.g., a source terminal) that is connected to the second input terminal (Pi2), a second terminal (e.g., a drain terminal) that is connected to the output terminal (Po), a third terminal (e.g., a bulk terminal), and a control terminal (e.g., a gate terminal) that is connected to the output terminal (Po). The resistor (Rb2) is connected between the third terminal of the transistor (M2) and the output terminal (Po). When the switch 71/72 conducts (i.e., the transistor (M1/M2) thereof conducts), a current can flow from a corresponding one of the first and second input terminals (Pi1, Pi2) to the output terminal (Po) through the transistor (M1/M2) thereof. When the switch 71/72 does not conduct (i.e., the transistor (M1/M2) thereof does not conduct), no current can flow from the corresponding one of the first and second input terminals (Pi1, Pi2) to the output terminal (Po) through the transistor (M1/M2) thereof.

In this embodiment, each switch 73, 74 includes a transistor (M3, M4). The transistor (M3) (e.g., an N-type metal oxide semiconductor field effect transistor (nMOSFET)) has a first terminal (e.g., a source terminal) that is connected to the first input terminal (Pi1), a second terminal (e.g., a drain terminal) that is grounded, a third terminal (e.g., a bulk terminal) that is grounded, and a control terminal (e.g., a gate terminal) that is connected to the second input terminal (Pi2). The transistor (M4) (e.g., an nMOSFET) has a first terminal (e.g., a source terminal) that is connected to the second input terminal (Pi2), a second terminal (e.g., a drain terminal) that is grounded, a third terminal (e.g., a bulk terminal) that is grounded, and a control terminal (e.g., a gate terminal) that is connected to the first input terminal (Pi1). When the switch 73/74 conducts (i.e., the transistor (M3/M4) thereof conducts), a current can flow from ground to a corresponding one of the first and second input terminals (Pi1, Pi2) through the transistor (M3/M4) thereof. When the switch 73/74 does not conduct (i.e., the transistor (M3/M4) thereof does not conduct), no current can flow from ground to the corresponding one of the first and second input terminals (Pi1, Pi2) through the transistor (M3/M4) thereof.

It should be noted that each resistor (Rb1, Rb2) has a resistance which is generally within a range of 10Ω to 300Ω. In addition, the resistors (Rb1, Rb2) can reduce reverse leakage currents of the transistors (M1, M2), and can reduce body effects of the transistors (M1, M2) (i.e., reducing threshold voltages of the transistors (M1, M2)), thereby increasing power conversion efficiency of the AC-to-DC converter 22.

Figure 5:
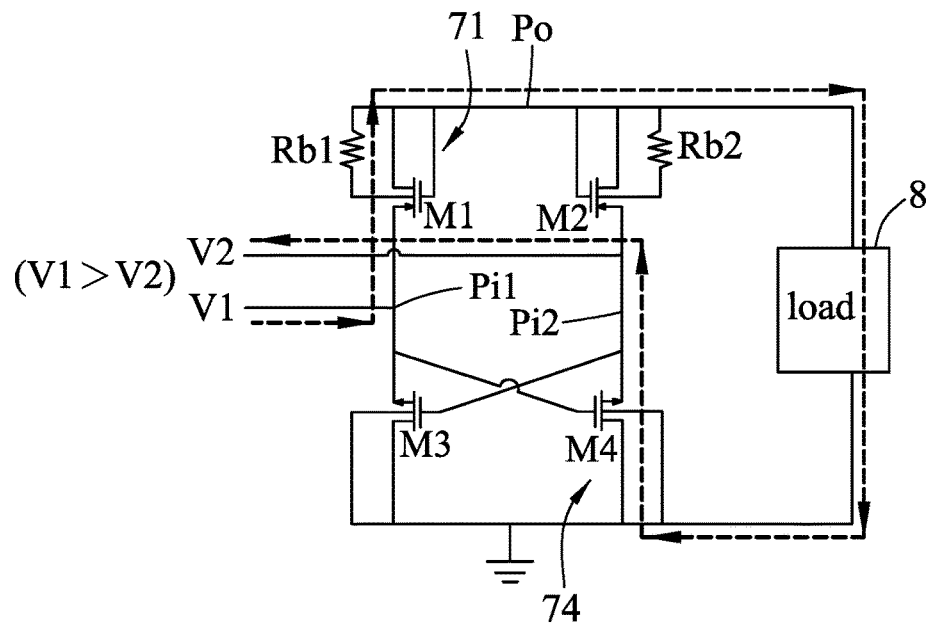
FIGS. 5 and 6 are circuit block diagrams illustrating operations of an AC-to-DC converter of a wireless power receiver of the embodiment.
Figure 6:
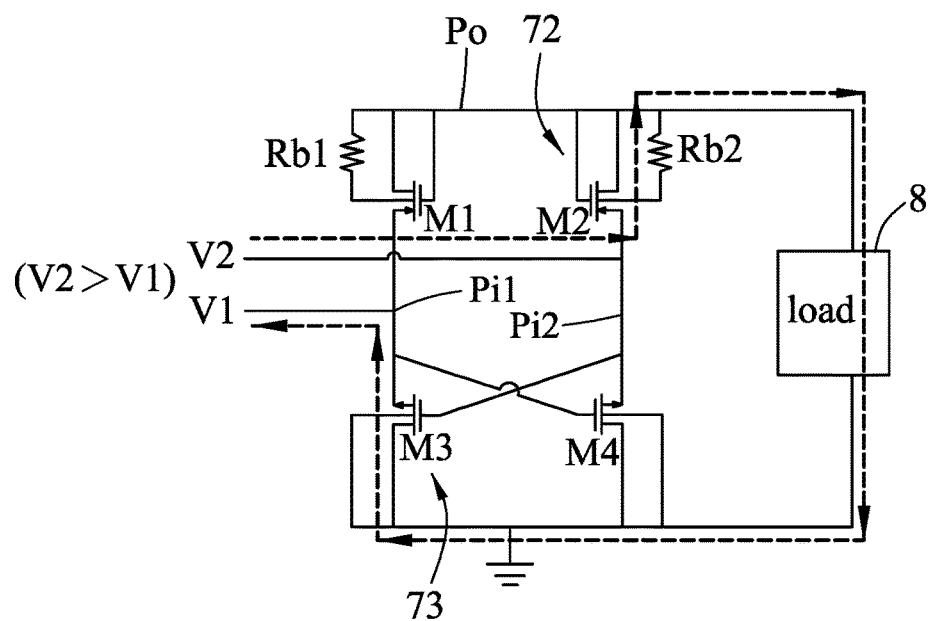

FIGS. 5 and 6 illustrate operations of the AC-to-DC converter 22 (see FIG. 4). In FIGS. 5 and 6, the DC-to-DC converter 23 (see FIG. 4) and the electronic device 6 (see FIG. 4) are depicted as a load 8 for the sake of brevity. Referring to FIGS. 4 and 5, when the AC induced voltage (Vac) causes a potential (V1) at the first input terminal (Pi1) to be higher than a potential (V2) at the second input terminal (Pi2), the transistors (M1, M4) may conduct while the transistors (M2, M3) do not conduct, and substantially all of an AC current output (Iac) provided by the receiver resonator 21 may sequentially flow through the conducting transistor (M1), the load 8 and the conducting transistor (M4) as shown in FIG. 5. Referring to FIGS. 4 and 6, when the AC induced voltage (Vac) causes the potential (V2) to be higher than the potential (V1), the transistors (M2, M3) may conduct while the transistors (M1, M4) do not conduct, and substantially all of the AC current output (Iac) may sequentially flow through the conducting transistor (M2), the load 8 and the conducting transistor (M3) as shown in FIG. 6.

Referring FIG. 4, the power storage element 25 is connected to the first and second input terminals (Pi1, Pi2) of the AC-to-DC converter 22. In this embodiment, the power storage element 25 includes a capacitor (CL) that is connected between the first and second input terminals (Pi1, Pi2) of the AC-to-DC converter 22.

It should be noted that, in a design phase of the wireless power transfer system of this embodiment, a capacitance of the capacitor (CL) may be determined as follows on a premise that energy outputted by the receiver resonator 21 during each half period of the AC induced voltage (Vac) is unchanged. First, for each of multiple values of the capacitance of the capacitor (CL), parameters of the transmitter resonator 12, the receiver resonator 21, the AC-to-DC converter 22 and the DC-to-DC converter 23 are adjusted in such a way that the transmitter and receiver resonators 12, 21 are capable of resonating at the same resonance frequency, and that energy outputted by the AC-to-DC converter 22 during each half period of the AC induced voltage (Vac) is maximized. Second, the capacitance of the capacitor (CL) is determined to be one of the values that corresponds to a maximum of the energy outputted by the AC-to-DC converter 22 during each half period of the AC induced voltage (Vac).

The DC-to-DC converter 23 is connected to the output terminal (Po) of the AC-to-DC converter 22 for receiving the DC converted voltage (Vdc) therefrom, and is used to be connected further to the electronic device 6. The DC-to-DC converter 23 converts the DC converted voltage (Vdc) into a DC output voltage (Vo) for charging the electronic device 6.

In this embodiment, the DC-to-DC converter 23 includes two capacitors (C1, Co) and a switching module 26. The capacitor (C1) has a first terminal that is connected to the output terminal (Po) of the AC-to-DC converter 22 for receiving the DC converted voltage (Vdc) therefrom, and a second terminal. The capacitor (Co) has a first terminal that is used to be connected to the electronic device 6 and that provides the DC output voltage (Vo), and a second terminal that is grounded. The switching module 26 is connected to the first and second terminals of each capacitor (C1, Co), and is operable to establish a first electrical connection between the first terminals of the capacitors (C1, Co), to establish a second electrical connection between the second terminals of the capacitors (C1, Co), and to establish a third electrical connection between the second terminal of the capacitor (C1) and the first terminal of the capacitor (Co).

In this embodiment, the switching module 26 includes four switches 27-30. The switch 27 (e.g., an nMOSFET) has a first terminal (e.g., a drain terminal) that is connected to the first terminal of the capacitor (C1), a second terminal (e.g., a source terminal) that is connected to the first terminal of the capacitor (Co), and a control terminal (e.g., agate terminal). The switch 27 establishes the first electrical connection when conducting. The switch 28 (e.g., an nMOSFET) has a first terminal (e.g., a drain terminal) that is connected to the second terminal of the capacitor (C1), a second terminal (e.g., a source terminal) that is connected to the second terminal of the capacitor (Co), and a control terminal (e.g., a gate terminal). The switch 28 establishes the second electrical connection when conducting. The switches 29, 30 are connected in series between the second terminal of the capacitor (C1) and the first terminal of the capacitor (Co). The switch 29 (e.g., an nMOSFET) has a first terminal (e.g., a drain terminal) that is connected to the second terminal of the capacitor (C1), a second terminal (e.g., a source terminal), and a control terminal (e.g., agate terminal) that is connected to the second terminal of the capacitor (C1). The switch 30 (e.g., an nMOSFET) has a first terminal (e.g., a drain terminal) that is connected to the second terminal of the switch 29, a second terminal (e.g., a source terminal) that is connected to the first terminal of the capacitor (Co), and a control terminal (e.g., a gate terminal). The switches 29, 30 cooperatively establish the third electrical connection when both are conducting. The third electrical connection permits current flow through the switches 29, 30 from the second terminal of the capacitor (C1) to the first terminal of the capacitor (Co) when the switches 29, 30 both conduct, and the current flow from the second terminal of the capacitor (C1) to the first terminal of the capacitor (Co) is prevented when otherwise.

The controller 24 is connected to the first terminal of the capacitor (Co) for receiving the DC output voltage (Vo) therefrom, is connected further to the control terminals of the switches 27, 28, 30, and further receives a mode signal (Mode). The controller 24 generates, based at least on the DC output voltage (Vo) and the mode signal (Mode), a first control signal (S1) for controlling operation of each switch 27, 28 between conduction and non-conduction, and a second control signal (S2) for controlling operation of the switch 30 between conduction and non-conduction, so as to stabilize a magnitude of the DC output voltage (Vo) at a predetermined voltage value.

The first control signal (S1) is switchable between an active state (corresponding to the conduction of each switch 27, 28, and being, for example, at a logic high level) and an inactive state (corresponding to the non-conduction of each switch 27, 28, and being, for example, at a logic low level). The second control signal (S2) is switchable between an active state (corresponding to the conduction of the switch 30, and being, for example, at a logic high level) and an inactive state (corresponding to the non-conduction of the switch 30, and being, for example, at a logic low level). The mode signal (Mode) is switchable between a logic high level and a logic low level.

Figure 7:
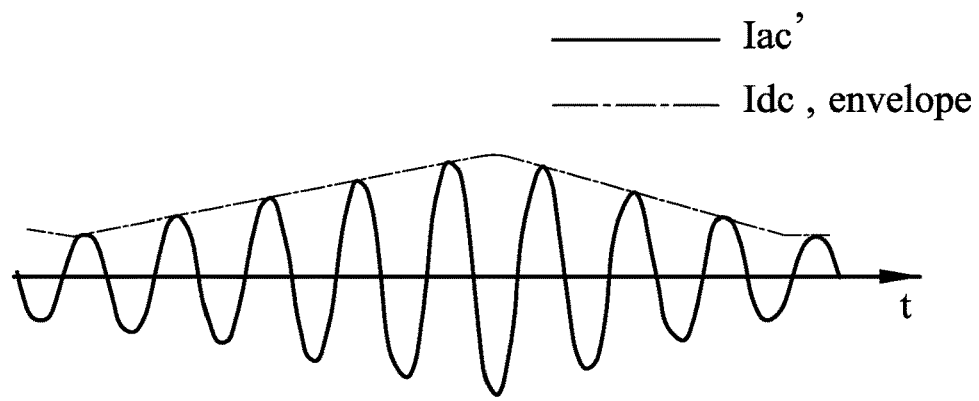
FIG. 7 is a timing diagram illustrating current outputs generated in the wireless power receiver that operates in a continuous conduction mode.
Figure 8:
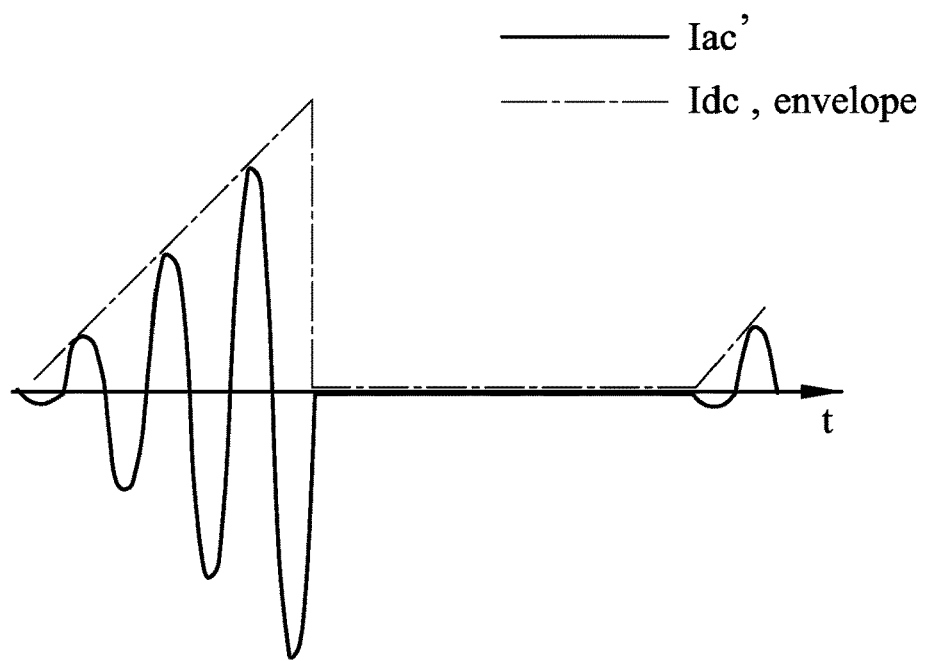
FIG. 8 is a timing diagram illustrating the current outputs generated in the wireless power receiver that operates in a discontinuous conduction mode.

In FIGS. 7 and 8, an AC current output portion (Iac') depicts a portion of the AC current output (Iac) that is to be converted by the AC-to-DC converter 22 (see FIG. 4) into a DC current output (Idc) flowing through the DC-to-DC converter 23 (see FIG. 4) and the electronic device 6 (see FIG. 4).

Referring to FIGS. 4 and 7, under a circumstance where the mode signal (Mode) is at the logic high level, each of the first and second control signals (S1, S2) switches between the active state and the inactive state, and has a duty cycle associated with the magnitude of the DC output voltage (Vo); and when one of the first and second control signals (S1, S2) is in the active state, the other one of the first and second control signals (S1, S2) is in the inactive state. When the first control signal (S1) is in the active state while the second control signal (S2) is in the inactive state, the switching module 26 operates in a first operating state where the switches 27, 28 both conduct and where the switch 30 does not conduct; the capacitors (C1, Co) are equivalently connected in parallel; and the AC current output (Iac) has a peak amplitude that is greater than zero and that increases gradually, so does the AC current output portion (Iac') as shown in FIG. 7. When the first control signal (S1) is in the inactive state while the second control signal (S2) is in the active state, the switching module 26 operates in a second operating state where both the switches 27, 28 do not conduct and where the switches 29, 30 both conduct; the capacitors (C1, Co) are equivalently connected in series; and the AC current output (Iac) has the peak amplitude that is greater than zero and that decreases gradually, so does the AC current output portion (Iac') as shown in FIG. 7. Therefore, the wireless power receiver 2 operates in a continuous conduction mode (CCM) when the mode signal (Mode) is at the logic high level.

Referring to FIGS. 4 and 8, under a circumstance where the mode signal (Mode) is at the logic low level, the first control signal (S1) switches between the active state and the inactive state while the second control signal (S2) is in the inactive state; and the duty cycle of the first control signal (S1) is associated with the magnitude of the DC output voltage (Vo) while the duty cycle of the second control signal (S2) is zero. When the first control signal (S1) is in the active state while the second control signal (S2) is in the inactive state, the switching module 26 operates in the first operating state where the switches 27, 28 both conduct and where the switch 30 does not conduct; the capacitors (C1, Co) are equivalently connected in parallel; and the AC current output (Iac) has the peak amplitude that is greater than zero and that increases gradually, so does the AC current output portion (Iac') as shown in FIG. 8. When the first and second control signals (S1, S2) are both in the inactive state, the switching module 23 operates in a third operating state where both the switches 27, 28, 30 do not conduct; the capacitors (C1, Co) are equivalently not connected to each other; the peak amplitude of the AC current output (Iac) is greater than zero and decreases gradually; and the peak amplitude of the AC current output portion (Iac') is zero as shown in FIG. 8 (i.e., no current). Therefore, the wireless power receiver 2 operates in a discontinuous conduction mode (DCM) when the mode signal (Mode) is at the logic low level.

Figure 1:
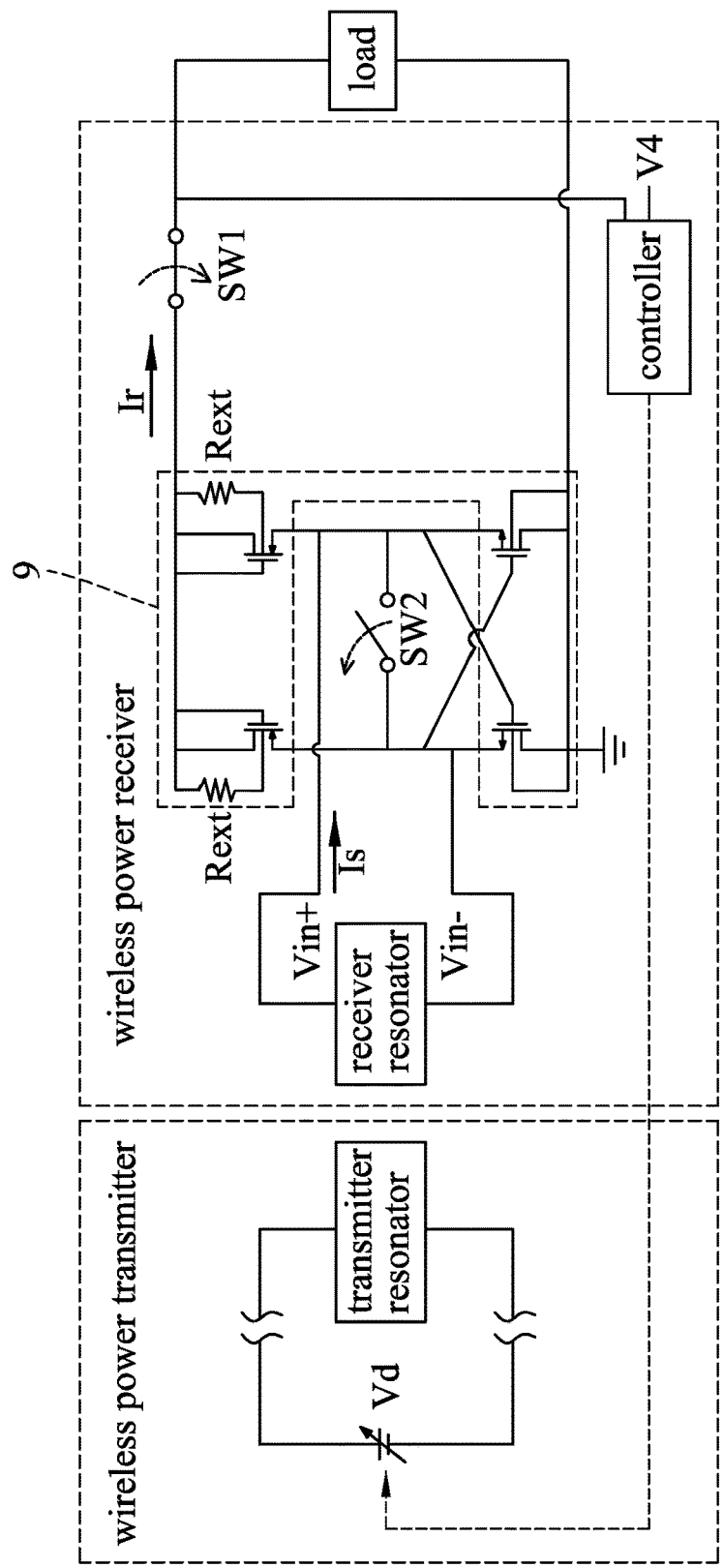
FIGS. 1 and 2 are circuit block diagrams illustrating a conventional wireless power transfer system.
Figure 2:
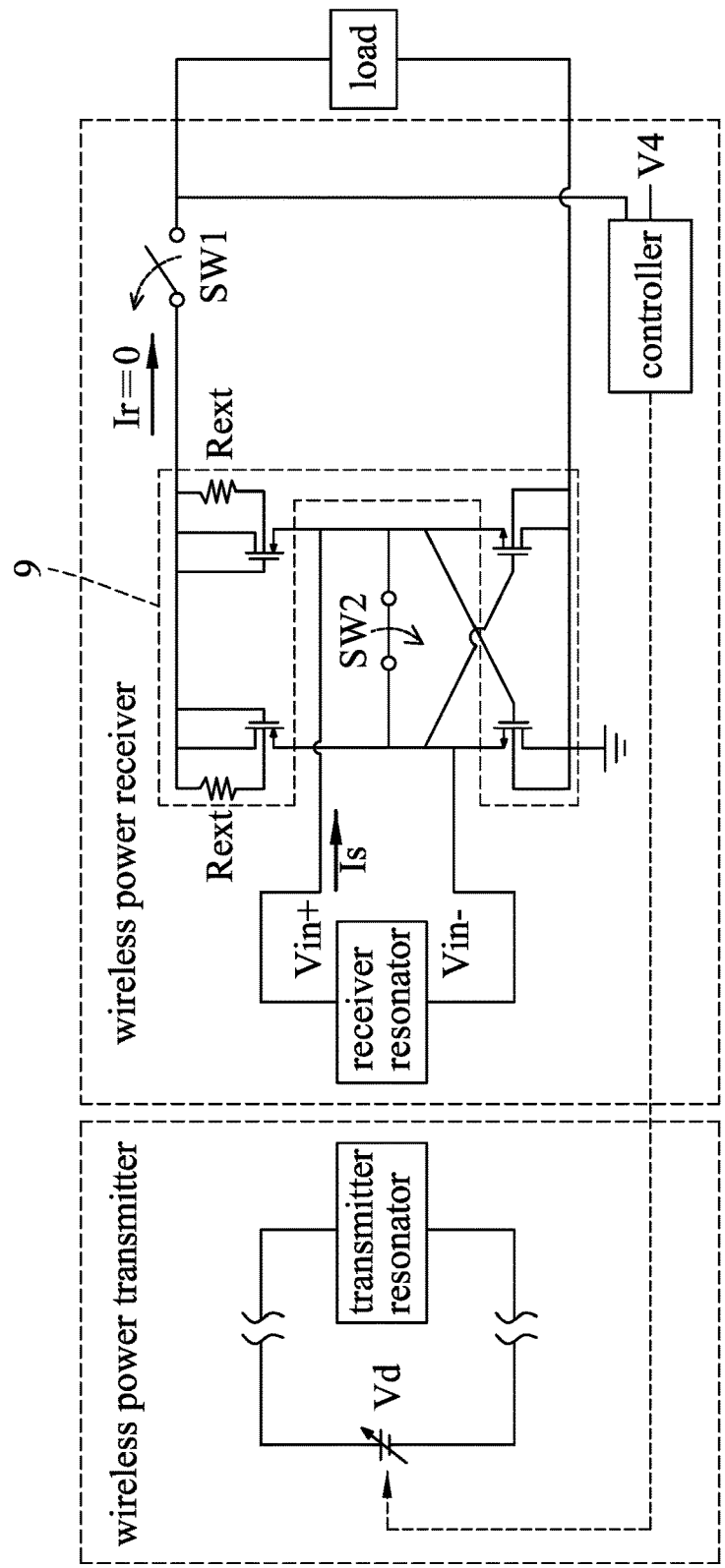
Figure 3:
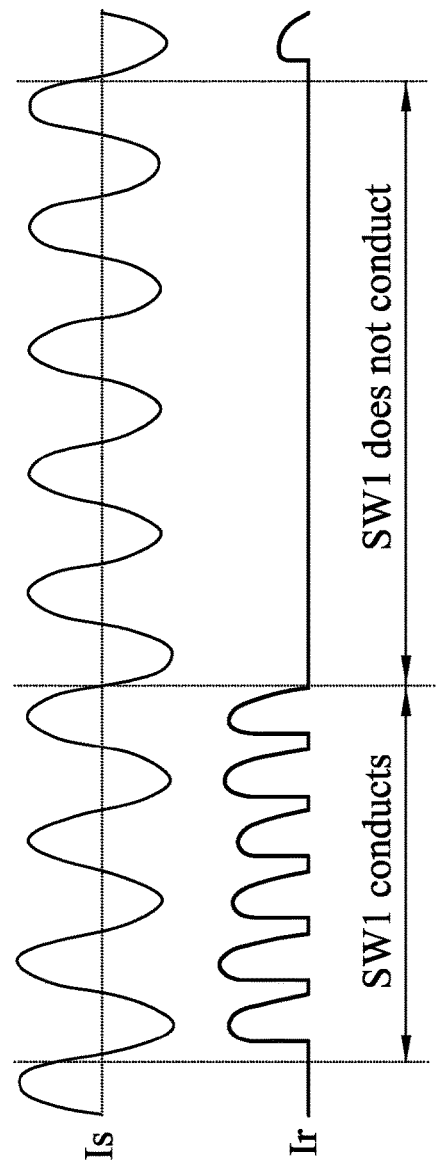
FIG. 3 is a timing diagram illustrating current outputs that are generated in a wireless power receiver of the conventional wireless power transfer system.

It is known from FIGS. 2, 7 and 8 that, under a circumstance where the energy outputted by the AC-to-DC converter 22 (see FIG. 4) during each period of the AC induced voltage (Vac) (see FIG. 4) in this embodiment is substantially the same as energy outputted by the AC-to-DC converter 9 (see FIG. 1) during each period of an AC induced voltage generated by the receiver resonator (see FIG. 1) in the conventional wireless power transfer system, the energy outputted by the receiver resonator 21 (see FIG. 4) during each period of the AC induced voltage (Vac) (see FIG. 4) in this embodiment when the wireless power receiver 2 (see FIG. 4) operates in the CCM is lower than that in this embodiment when the wireless power receiver 2 (see FIG. 4) operates in the DCM, and is also lower than that in the conventional wireless power transfer system.

Referring to FIG. 4, the controller 24 further generates, based on the duty cycle of the first control signal (S1), a third control signal (Sf) for wirelessly controlling the magnitude of the DC supply voltage (Vdd), so as to stabilize the duty cycle of the first control signal (S1) at a predetermined duty cycle value (e.g., 80%). The predetermined duty cycle value is set such that the wireless power transfer system of this embodiment can have sufficiently high power conversion efficiency, and such that the magnitude of the DC output voltage (Vo) can be stabilized at the predetermined voltage value.

Figure 9:
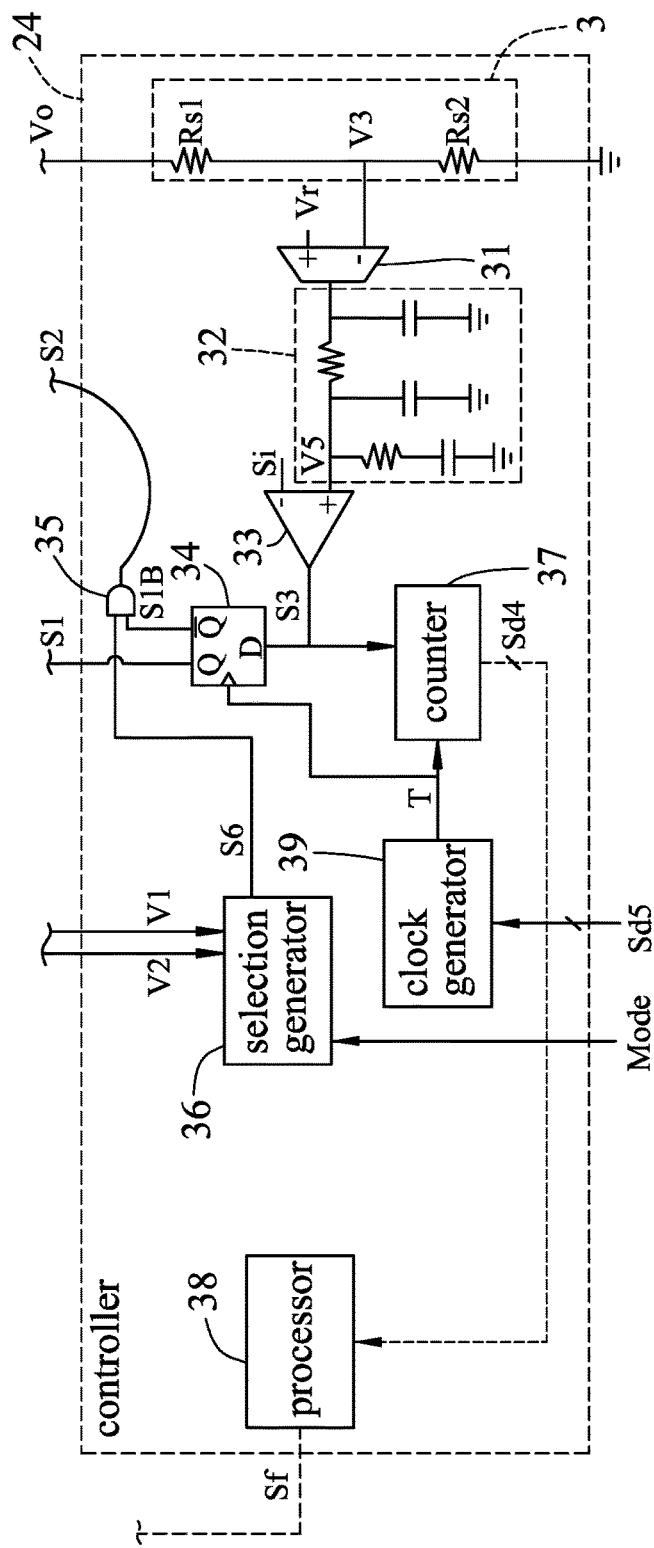
FIG. 9 is a circuit block diagram illustrating a controller of the wireless power receiver.

Referring to FIGS. 4 and 9, in this embodiment, the controller 24 includes a voltage divider 3, an amplifier 31, a filter 32, a comparator 33, a selection generator 36, a clock generator 39, a D flip-flop 34, an AND gate 35, a counter 37 and a processor 38.

The voltage divider 3 includes two resistors (Rs1, Rs2) that are connected in series between the first terminal of the capacitor (Co) and ground, with the resistor (Rs1) connected to the first terminal of the capacitor (Co) and the resistor (Rs2) connected to ground. The resistors (Rs1, Rs2) cooperatively divide the DC output voltage (Vo) from the first terminal of the capacitor (Co) to generate at a common node thereof a divided voltage (V3) with a magnitude of (vo×[rs2/(rs1+rs2)]), where vo denotes the magnitude of the DC output voltage (Vo), and where rs1 and rs2 respectively denote resistances of the resistors (Rs1, Rs2).

The amplifier 31 is an operational transimpedance amplifier (OTA), and has a non-inverting input terminal that receives a predetermined reference voltage (Vr) with a magnitude of (vt×[rs2/(rs1+rs2)]), an inverting input terminal that is connected to the common node of the resistors (Rs1, Rs2) for receiving the divided voltage (V3) therefrom, and an output terminal, where vt denotes the predetermined voltage value. The amplifier 31 amplifies a magnitude difference between the predetermined reference voltage (Vr) and the divided voltage (V3) to generate an amplified current output, and outputs the amplified current output at the output terminal thereof.

The filter 32 is connected to the amplifier 31 for receiving the amplified current output therefrom, and filters out high frequency noises in the amplified current output to generate a filtered voltage (V5).

The voltage divider 3, the amplifier 31 and the filter 32 cooperate to decrease a magnitude of the filter voltage (V5) when the magnitude of the DC output voltage (Vo) is greater than the predetermined voltage value, and to increase the magnitude of the filter voltage (V5) when the magnitude of the DC output voltage (Vo) is less than the predetermined voltage value.

The comparator 33 has a non-inverting input terminal that is connected to the filter 32 for receiving the filtered voltage (V5) therefrom, an inverting input terminal that receives a reference voltage signal (Si) with a sawtooth waveform and a frequency which is, for example, one-sixteenth of the resonance frequency (i.e., 1/16×13.56 MHz=848 KHz), and an output terminal. The comparator 33 compares the filtered voltage (V5) and the reference voltage signal (Si) to generate a comparison signal (S3), and outputs the comparison signal (S3) at the output terminal thereof. The comparison signal (S3) is at a logic high level when the filtered voltage (V5) is higher than the reference voltage signal (Si) in magnitude, and is at a logic low level when the filtered voltage (V5) is lower than the reference voltage signal (Si) in magnitude. Therefore, the comparison signal (S3) is pulse width modulated, has a pulse width modulation (PWM) frequency that equals the frequency of the reference voltage signal (Si) (i.e., 848 KHz), and has a pulse width (i.e., a time interval during which the comparison signal (S3) is at the logic high level) that increases with increasing magnitude of the filtered voltage (V5).

Figure 10:
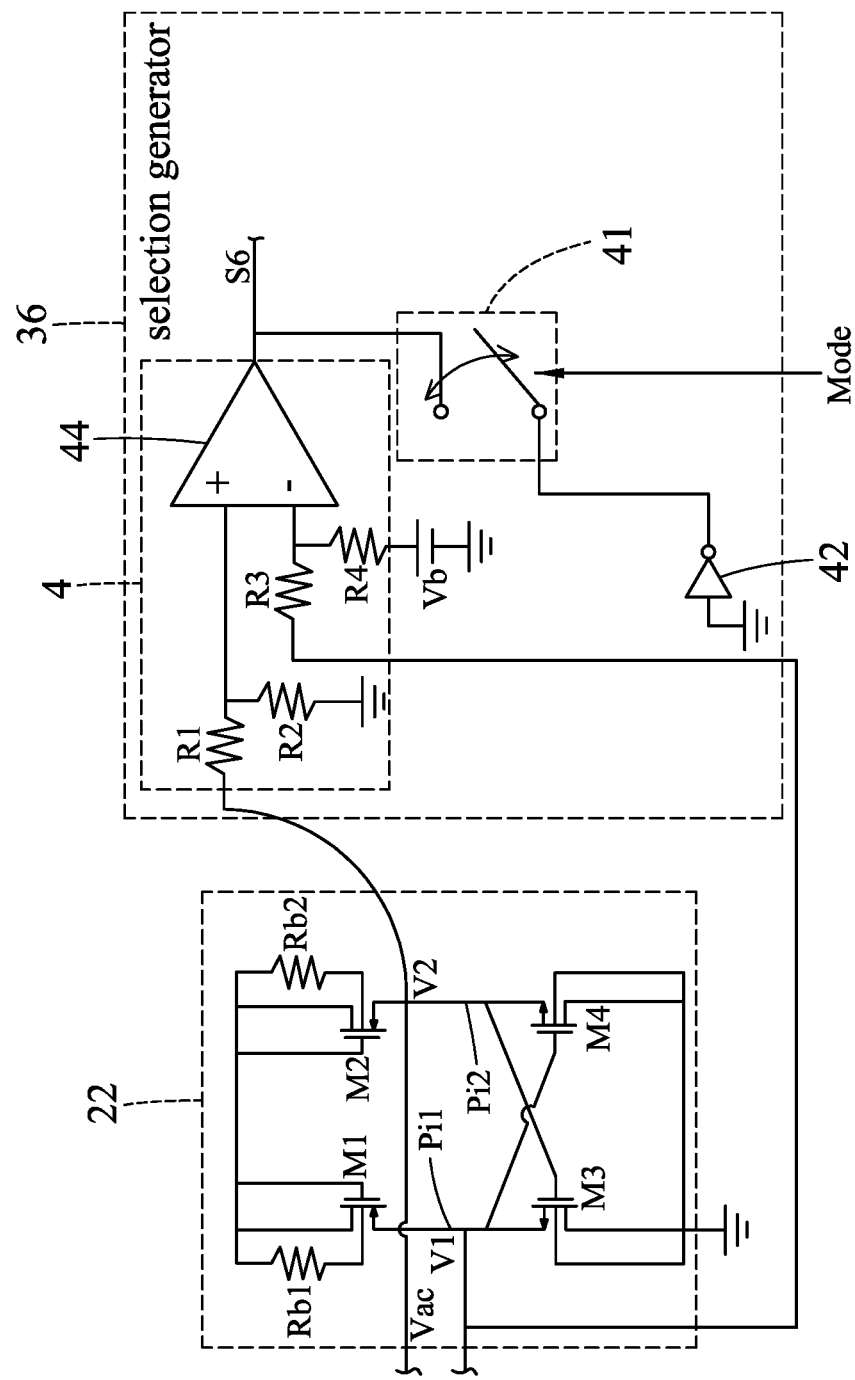
FIG. 10 is a circuit diagram illustrating a selection generator of the controller.

Referring to FIGS. 9 and 10, the selection generator 36 is connected to the first and second input terminals (Pi1, Pi2) of the AC-to-DC converter 22 for receiving the potentials (V1, V2) respectively therefrom, further receives the mode signal (Mode), and generates a selection signal (S6) based on the potentials (V1, V2) and the mode signal (Mode).

In this embodiment, the selection generator 36 includes an inverter 42, a switch 41 and a comparing module 4. The inverter 42 has an input terminal that is grounded, and an output terminal. The switch 41 has a first terminal that is connected to the output terminal of the inverter 42, and a second terminal that provides the selection signal (S6). The switch 41 receives the mode signal (Mode), conducts when the mode signal (Mode) is at the logic high level, and does not conduct when the mode signal (Mode) is at the logic low level. The comparing module 4 includes four resistors (R1-R4) and a comparator 44. The resistor (R1) has a first terminal that is connected to the second input terminal (Pi2) of the AC-to-DC converter 22 for receiving the potential (V2) therefrom, and a second terminal. The resistor (R2) is connected between the second terminal of the resistor (R1) and ground. The resistor (R3) has a first terminal that is connected to the first input terminal (Pi1) of the AC-to-DC converter 22 for receiving the potential (V1) therefrom, and a second terminal. The resistor (R4) has a first terminal that is connected to the second terminal of the resistor (R3), and a second terminal that receives a predetermined bias voltage (Vb). The comparator 44 has a non-inverting input terminal that is connected to the second terminal of the resistor (R1), an inverting input terminal that is connected to the second terminal of the resistor (R3), and an output terminal that is connected to the second terminal of the switch 41. The comparator 44 has an output driving capability weaker than that of the inverter 42. The inverter 42 forces the selection signal (S6) to be at a logic high level through the conducting switch 41 when the mode signal (Mode) is at the logic high level. Resistances of the resistors (R1-R4) and a magnitude of the predetermined bias voltage (Vb) are set such that the comparator 44 forces the selection signal (S6) to be at a logic low level when the mode signal (Mode) is at the logic low level.

Referring to FIGS. 4 and 9, the clock generator 39 receives a digital setting signal (Sd5) of, for example, 5 bits, and generates a clock signal (T) based on the digital setting signal (Sd5). The digital setting signal (Sd5) is set such that the clock signal (T) has the resonance frequency (i.e., 13.56 MHz).

The D flip-flop 34 has a data input terminal that is connected to the output terminal of the comparator 33 for receiving the comparison signal (S3) therefrom, a clock input terminal that is connected to the clock generator 39 for receiving the clock signal (T) therefrom, a non-inverting data output terminal that is connected to the control terminals of the switches 27, 28 and that provides the first control signal (Si), and an inverting data output terminal that provides an inverted first control signal (S1B). The D flip-flop 34 quantizes the pulse width of the comparison signal (S3) based on the clock signal (T) to generate the first control signal (S1) and the inverted first control signal (S1B) that are complementary to each other. Therefore, the duty cycle of the first control signal (S1) equals a product of the quantized pulse width and the PWM frequency of the comparison signal (S3), and increases with increasing pulse width of the comparison signal (S3).

The AND gate 35 has a first input terminal that is connected to the second terminal of the switch 41 (see FIG. 10) for receiving the selection signal (S6) therefrom, a second input terminal that is connected to the inverting data output terminal of the D flip-flop 34 for receiving the inverted first control signal (SIB) therefrom, and an output terminal that is connected to the control terminal of the switch 30 and that provides the second control signal (S2).

The selection generator 36 and the AND gate 35 cooperate to make the second control signal (S2) complementary to the first control signal (S1) when the mode signal (Mode) is at the logic high level, and to make the second control signal (S2) be in the inactive state when the mode signal (Mode) is at the logic low level.

As a result, when the magnitude of the DC output voltage (Vo) is greater than the predetermined voltage value, the duty cycle of the first control signal (S1) decreases, and the duty cycle of the second control signal (S2) increases or equals zero, resulting in decrease of the magnitude of the DC output voltage (Vo). In addition, when the magnitude of the DC output voltage (Vo) is less than the predetermined voltage value, the duty cycle of the first control signal (S1) increases, and the duty cycle of the second control signal (S2) decreases or equals zero, resulting in increase of the magnitude of the DC output voltage (Vo).

The counter 37 is connected to the output terminal of the comparator 33 for receiving the comparison signal (S3) therefrom, and is connected further to the clock generator 39 for receiving the clock signal (T) therefrom. The counter 37 performs time-to-digital conversion upon the pulse width of the comparison signal (S3) based on the clock signal (T) to generate a digital indication signal (Sd4) that has, for example, 4 bits and that indicates the duty cycle of the first control signal (S1), and wirelessly transmits the digital indication signal (Sd4). Since the PWM frequency of the comparison signal (S3) is 848 KHz, the digital indication signal (Sd4) carries 848000 pieces of data every second.

The processor 38 wirelessly receives the digital indication signal (Sd4) from the counter 37, stores the data carried by the digital indication signal (Sd4), calculates an average of every N (N2) pieces of the stored data, generates the third control signal (Sf) based on at least some of the averages, and wirelessly transmits the third control signal (Sf) for receipt by the power supply 13. For example, N=1000, 848 averages are generated every second, and five of the 848 averages are used to generate the third control signal (Sf) every second. In addition, the processor 38 generates the third control signal (Sf) in such a way that the magnitude of the DC supply voltage (Vdd) increases when the duty cycle indicated by the average is greater than the predetermined duty cycle value, and that the magnitude of the DC supply voltage (Vdd) decreases when the duty cycle indicated by the average is less than the predetermined duty cycle value. For example, the third control signal (Sf) is a digital signal; a value represented by the third control signal (Sf) is increased when the duty cycle indicated by the average is greater than the predetermined duty cycle value, and is decreased when the duty cycle indicated by the average is less than the predetermined duty cycle value; and the power supply 13 includes a digital-to-analog converter (not shown) that performs digital-to-analog conversion on the third control signal (Sf) to generate the DC supply voltage (Vdd).

Figure 11:
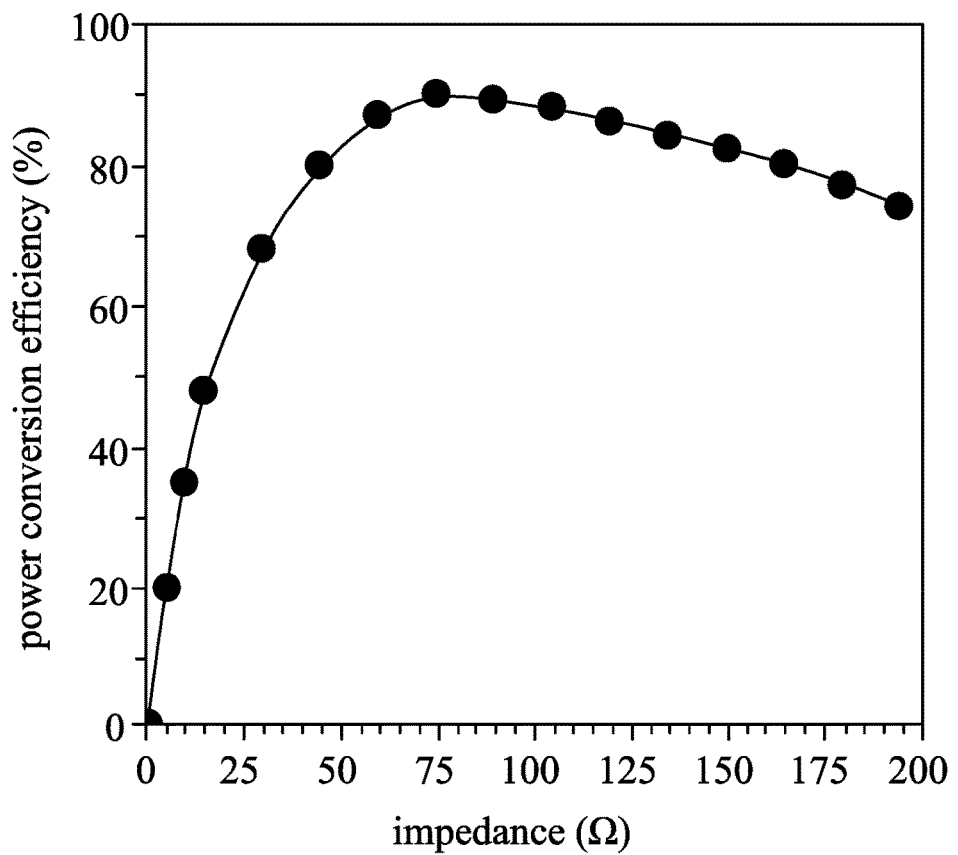
FIG. 11 is a plot illustrating simulated power conversion efficiency of the embodiment.

FIG. 11 illustrates simulated power conversion efficiency of a combination of the transmitter and receiver resonators 12, 21 (see FIG. 4) under a circumstance where an impedance seen by the receiver resonator 21 (see FIG. 4) is within a range of 0Ω to 200Ω. It is known from FIG. 11 that the power conversion efficiency is good.

Referring to FIG. 4, in view of the above, the wireless power transfer system of this embodiment has the following advantages:

1. By virtue of the capacitor (CL) that is connected between the first and second input terminals (Pi1, Pi2) of the AC-to-DC converter 22, the AC current output (Iac) has a relatively small root mean square amplitude when the AC-to-DC converter 22 provides no current to the DC-to-DC converter 23 and the electronic device 6, resulting in relatively small power loss of the wireless power receiver 2 and relatively high power conversion efficiency of the wireless power receiver 2.

2. The capacitance of the capacitor (CL) is less than a capacitance of the switch 27. When a voltage spike is induced on any of the first and second input terminals (Pi1, Pi2) of the AC-to-DC converter 22 due to, for example, electrostatic discharge (ESD), the capacitor (CL) endures a larger amount of the voltage spike compared with the non-conducting switch 27, thereby alleviating voltage stress endured by the non-conducting switch 27.

3. No switch is connected between the first and second input terminals (Pi1, Pi2) of the AC-to-DC converter 22, so body switching technique is not required.

It should be noted that, by virtue of the resonant inductive coupling, power conversion efficiency of the wireless power transfer system of this embodiment may be acceptable even if a distance between the wireless power transmitter and receiver 1, 2 exceeds 10 cm. In addition, by virtue of the controller 24 that controls the operation of each switch 27, 28, 30 included in the wireless power receiver 2 to stabilize the magnitude of the DC output voltage (Vo) at the predetermined voltage value, the wireless power transfer system of this embodiment has a faster response to deviation of the magnitude of the DC output voltage (Vo) from the predetermined voltage value than a wireless power transfer system that controls the magnitude of the DC supply voltage (Vdd) generated in the wireless power transmitter 1 to stabilize the magnitude of the DC output voltage (Vo) at the predetermined voltage value.

It should be noted that, in other embodiments, the following modifications maybe made to this embodiment:

1. Referring to FIG. 9, the selection generator 36 may be omitted, and the mode signal (Mode) may serve as the selection signal (S6).

Figure 12:
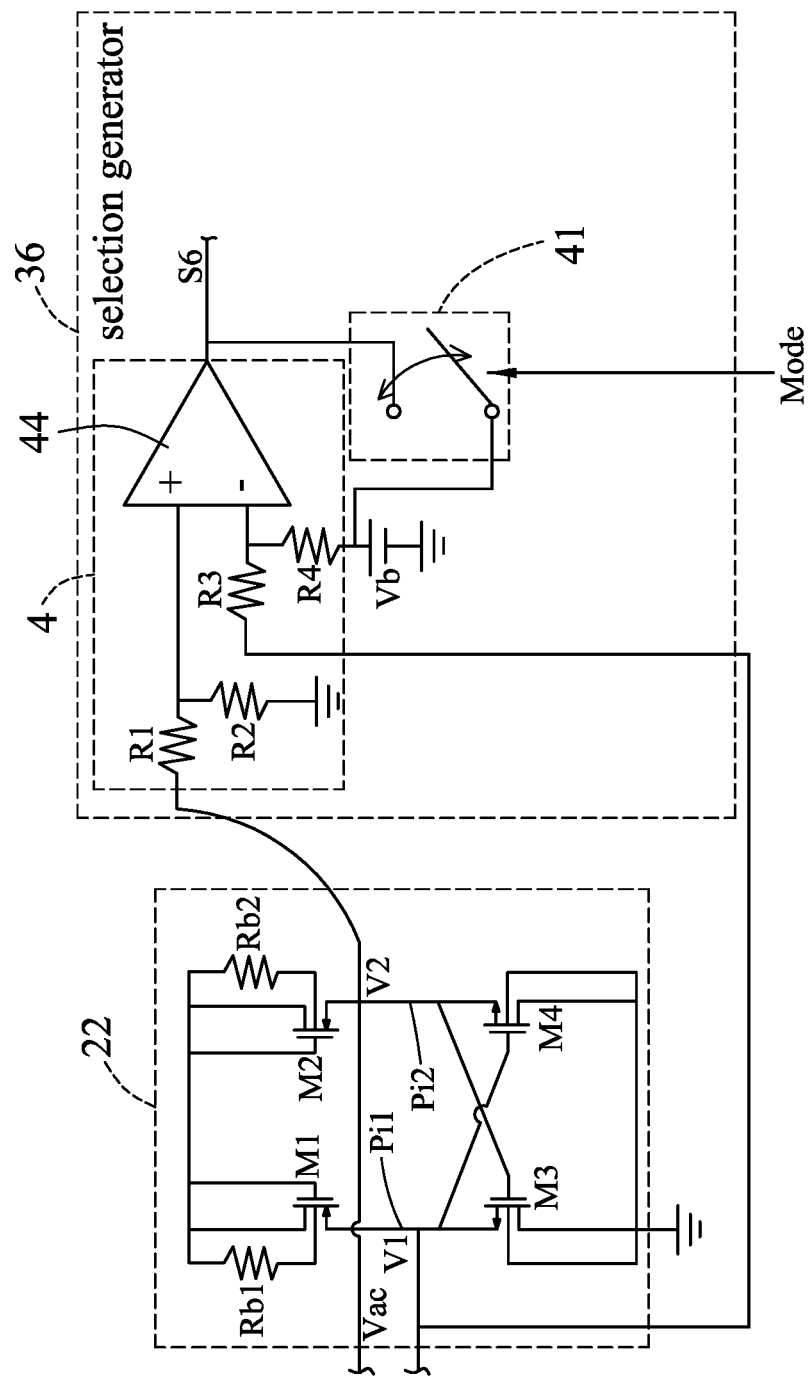
FIG. 12 is a circuit diagram illustrating a modification of the embodiment.

2. Referring to FIG. 12, the inverter 42 (see FIG. 10) maybe omitted, and the first terminal of the switch 41 may receive the predetermined bias voltage (Vb). In this case, the predetermined bias voltage (Vb) forces the selection signal (S6) to be at the logic high level through the conducting switch 41 when the mode signal (Mode) is at the logic high level.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. A wireless power transfer system comprising:
a wireless power transmitter capable of resonating at a resonance frequency, and for wirelessly transmitting power at the resonance frequency; and
a wireless power receiver including
a receiver resonator capable of resonating at the resonance frequency, and for wirelessly receiving the power from said wireless power transmitter at the resonance frequency through resonant inductive coupling to generate an AC (alternating current) induced voltage,
an AC-to-DC (direct current) converter having a first input terminal and a second input terminal that are connected to said receiver resonator for receiving the AC induced voltage therefrom, and an output terminal, said AC-to-DC converter converting the AC induced voltage into a DC converted voltage, and outputting the DC converted voltage at the output terminal thereof,
a power storage element connected to said first and second input terminals of said AC-to-DC converter, and
a DC-to-DC converter connected to said output terminal of said AC-to-DC converter for receiving the DC converted voltage therefrom, and converting the DC converted voltage into a DC output voltage;
wherein said DC-to-DC converter includes
a first capacitor having a first terminal that is connected to said output terminal of said AC-to-DC converter for receiving the DC converted voltage therefrom, and a second terminal,
a second capacitor having a first terminal that provides the DC output voltage, and a second terminal that is grounded, and
a switching module connected to said first and second terminals of each of said first and second capacitors, and operable to establish a first electrical connection between said first terminals of said first and second capacitors. to establish a second electrical connection between said second terminals of said first and second capacitors, and to establish a third electrical connection between said second terminal of said first capacitor and said first terminal of said second capacitor.

2. The wireless power transfer system of claim 1, wherein said power storage element includes a capacitor that is connected between said first and second input terminals of said AC-to-DC converter.

3. The wireless power transfer system of claim 1, wherein said AC-to-DC converter includes:
a first switch connected between said first input terminal and said output terminal, and permitting current flow therethrough from said first input terminal to said output terminal when conducting;
a second switch connected between said second input terminal and said output terminal, and permitting current flow therethrough from said second input terminal to said output terminal when conducting;
a third switch connected between said first input terminal and ground, and permitting current flow therethrough from ground to said first input terminal when conducting; and
a fourth switch connected between said second input terminal and ground, and permitting current flow therethrough from ground to said second input terminal when conducting.

4. The wireless power transfer system of claim 3, wherein:
said first switch includes a first transistor having a first terminal that is connected to said first input terminal, a second terminal that is connected to said output terminal, and a control terminal that is connected to said output terminal;
said second switch includes a second transistor having a first terminal that is connected to said second input terminal, a second terminal that is connected to said output terminal, and a control terminal that is connected to said output terminal;

said third switch includes a third transistor having a first terminal that is connected to said first input terminal, a second terminal that is grounded, and a control terminal that is connected to said second input terminal; and said fourth switch includes a fourth transistor having a first terminal that is connected to said second input terminal, a second terminal that is grounded, and a control terminal that is connected to said first input terminal.

5. The wireless power transfer system of claim 4, wherein:

each of said first to fourth transistors further has a third terminal;

said first switch further includes a first resistor that is connected between said third terminal of said first transistor and said output terminal;

said second switch further includes a second resistor that is connected between said third terminal of said second transistor and said output terminal; and said third terminal of each of said third and fourth transistors is grounded.

6. The wireless power transfer system of claim 1, wherein said switching module is operable in a first operating state where the first and second electrical connections are established, and where the third electrical connection is not established, a second operating state where the first and second electrical connections are not established, and where the third electrical connection is established, and a third operating state where the first to third electrical connections are not established.

7. The wireless power transfer system of claim 1, wherein said switching module includes:

a first switch connected between said first terminals of said first and second capacitors, and establishing the first electrical connection when conducting;

a second switch connected between said second terminals of said first and second capacitors, and establishing the second electrical connection when conducting; and a third switch and a fourth switch connected in series between said second terminal of said first capacitor and said first terminal of said second capacitor, and cooperatively establishing the third electrical connection when both are conducting, the third electrical connection permitting current flow through said third and fourth switches from said second terminal of said first capacitor to said first terminal of said second capacitor when said third and fourth switches both conduct.

8. The wireless power transfer system of claim 7, wherein said wireless power receiver further includes a controller that is connected to said first terminal of said second capacitor for receiving the DC output voltage therefrom, and that is connected further to said first, second and fourth switches, said controller generating, based on the DC output voltage, a first control signal for controlling operation of each of said first and second switches between conduction and non-conduction, and a second control signal for controlling operation of said fourth switch between conduction and non-conduction, so as to stabilize a magnitude of the DC output voltage at a predetermined voltage value, at least the first control signal switching between an active state that corresponds to the conduction of each of said first and second switches, and an inactive state that corresponds to the non-conduction of each of said first and second switches, and having a duty cycle associated with the magnitude of the DC output voltage.

9. The wireless power transfer system of claim 8, wherein:

said wireless power transmitter generates a DC supply voltage with a variable magnitude, and wirelessly transmitting the power based on the DC supply voltage so that an amplitude of the AC induced voltage is positively correlated to the magnitude of the DC supply voltage; and said controller further generates, based on the duty cycle of the first control signal, a third control signal for controlling the magnitude of the DC supply voltage, so as to stabilize the duty cycle of the first control signal at a predetermined duty cycle value.

10. A wireless power receiver comprising:

a receiver resonator capable of resonating at a resonance frequency, and for wirelessly receiving power at the resonance frequency through resonant inductive coupling to generate an AC (alternating current) induced voltage;

an AC-to-DC (direct current) converter having a first input terminal and a second input terminal that are connected to said receiver resonator for receiving the AC induced voltage therefrom, and an output terminal, said AC-to-DC converter converting the AC induced voltage into a DC converted voltage, and outputting the DC converted voltage at the output terminal thereof;

a power storage element connected to said first and second input terminals of said AC-to-DC converter; and a DC-to-DC converter connected to said output terminal of said AC-to-DC converter for receiving the DC converted voltage therefrom, and converting the DC converted voltage into a DC output voltage;

wherein said DC-to-DC converter includes a first capacitor having a first terminal that is connected to said output terminal of said AC-to-DC converter for receiving the DC converted voltage therefrom, and a second terminal, a second capacitor having a first terminal that provides the DC output voltage, and a second terminal that is grounded, and a switching module connected to said first and second terminals of each of said first and second capacitors, and operable to establish a first electrical connection between said first terminals of said first and second capacitors, to establish a second electrical connection between said second terminals of said first and second capacitors, and to establish a third electrical connection between said second terminal of said first capacitor and said first terminal of said second capacitor.

* * * * *